United States Patent
Garg et al.

(10) Patent No.: US 8,661,051 B1
(45) Date of Patent: *Feb. 25, 2014

(54) CONTEXTUAL N-GRAM ANALYSIS

(75) Inventors: Ashutosh Garg, Sunnyvale, CA (US); Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,933

(22) Filed: Sep. 14, 2012

Related U.S. Application Data

(63) Continuation of application No. 12/061,573, filed on Apr. 2, 2008, now Pat. No. 8,359,326.

(51) Int. Cl.
*G06F 7/00* (2006.01)
*G06F 17/30* (2006.01)
*G06F 13/14* (2006.01)

(52) U.S. Cl.
USPC ........................................................ 707/767

(58) Field of Classification Search
USPC .................. 707/696, 736, 749, 767; 704/251
See application file for complete search history.

(56) References Cited

U.S. PATENT DOCUMENTS

| | | | | |
|---|---|---|---|---|
| 7,039,636 | B2 * | 5/2006 | Tada et al. | 1/1 |
| 7,284,009 | B2 * | 10/2007 | Perrow | 1/1 |
| 2008/0091670 | A1 * | 4/2008 | Ismalon | 707/5 |
| 2009/0248669 | A1 * | 10/2009 | Shetti et al. | 707/5 |

OTHER PUBLICATIONS

Srikanth and Srihari. "Biterm Language Models for Document Retrieval." SIGIR Conference on Research and Development in Information Retrieval, Tampere, Finland, Aug. 11-15, 2002, 2 pages.
Baeza, et al. "Second Edition of the 'XML and Information Retrieval' Workshop." Special Interest Group on Information Retrieval, SIGIR Conference on Research and Development in Information Retrieval, Tampere, Finland, Aug. 11-15, 2002, 5 pages.
Song and Croft "A General Language Model for Information Retrieval." CIKM '99 Conference on Information and Knowledge Management, Nov. 2-6, 1999, 6 pages.

* cited by examiner

*Primary Examiner* — Usmaan Saeed
*Assistant Examiner* — Cecile Vo
(74) *Attorney, Agent, or Firm* — Fish & Richardson P.C.

(57) ABSTRACT

Methods, systems, and apparatus, including computer program products, in which a first search query in a session is compared to a second search query within the session to determine whether any terms included in the second search query differ from terms in the first search query. If differing search terms are identified in the second search query, the differing search terms can be excluded from bigram analysis with other search terms included in the second query.

20 Claims, 5 Drawing Sheets

Q1 = A B
Q2 = A B C  C excluded from consideration as part of a bigram

Q1 = A B
Q2 = B A  A & B excluded from consideration as part of a bigram

Q1 = A B
Q2 = C B A  A, B & C excluded from consideration as part of a bigram

Q1 = A B C
Q2 = A B D E  D & E excluded from consideration as part of a bigram with B

CONTEXTUAL N-GRAM ANALYSIS

CROSS REFERENCE TO RELATED APPLICATION

This application is a continuation application of, and claims priority to, U.S. patent application Ser. No. 12/061,573, entitled "CONTEXTUAL N-GRAM ANALYSIS," which was filed on Apr. 2, 2008. The disclosure of which is incorporated herein by reference in its entirety.

BACKGROUND

This disclosure relates to providing n-gram analysis for search queries. A search engine allows a user to provide a search query for which search results are returned in response. Some search engines can analyze the query to identify n-grams. N-grams are groups of words that have a statistically significant probability of appearing adjacent to one another when compared to their statistical chance of appearing next to other words. For example, if a user entered a search query "hot dog." The user is probably attempting to retrieve information about the bigram "hot dog," rather than just any document that includes the words "hot" and "dog." Thus, the terms "hot" and "dog" are constituent terms describing a bigram. Search systems commonly use bigram language modeling to identify and weight the occurrence of bigrams within a document (see, e.g., Srikanth, M. And Srihari, R. "Biterm Language Models for Document Retrieval," Special Interest Group on Information Retrieval '02 (SIGIR'02), Aug. 11-15, 2002; and, Song, F. and Croft, W. B., "A General Language Model for Information Retrieval," Conference on Information and Knowledge Management '99 (CIKM'99)). However, identifying n-grams (e.g., bigrams) can be computationally intensive when there are many terms included in a search query. For example, a query containing five terms can describe four potential bigrams, and each of the potential bigrams is analyzed to determine whether it is a bigram. Inspecting each of the potential bigrams can be inefficient. Moreover, traditional bigram analysis assumes complete sentences, correct grammar, etc. However, search queries are often expressed as a sequence of keywords. It can be difficult to determine whether two consecutive words within a search query are intended to be an n-gram or separate keywords.

SUMMARY

This specification describes technologies by which potential bigrams can be eliminated from consideration by context.

In general, one aspect of the subject matter described in this specification can be embodied in methods that include the actions of receiving a first search query during a search session, the first search query comprising a first set of search terms and each of the terms in the first set of search terms having a first ordinal position; receiving a second search query during the search session, the second search query comprising a second set of search terms and each of the terms in the second set of search terms having a second ordinal position; determining whether any of the first set of search terms match any of the second set of search terms; if it is determined that any of the first set of search terms match any of the second set of search terms, identifying differing search terms in the second set of search terms that differ from any of the search terms included in the first set of search terms; and excluding the differing search terms from bigram analysis in combination with any of the first set of search terms. Other embodiments of this aspect include corresponding systems, apparatus, and computer program products.

Particular implementations of the subject matter described in this specification can be implemented so as to realize one or more of the following advantages. The number of potential bigrams to be analyzed is reduced based upon query context, thereby increasing the efficiency of the bigram analysis.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
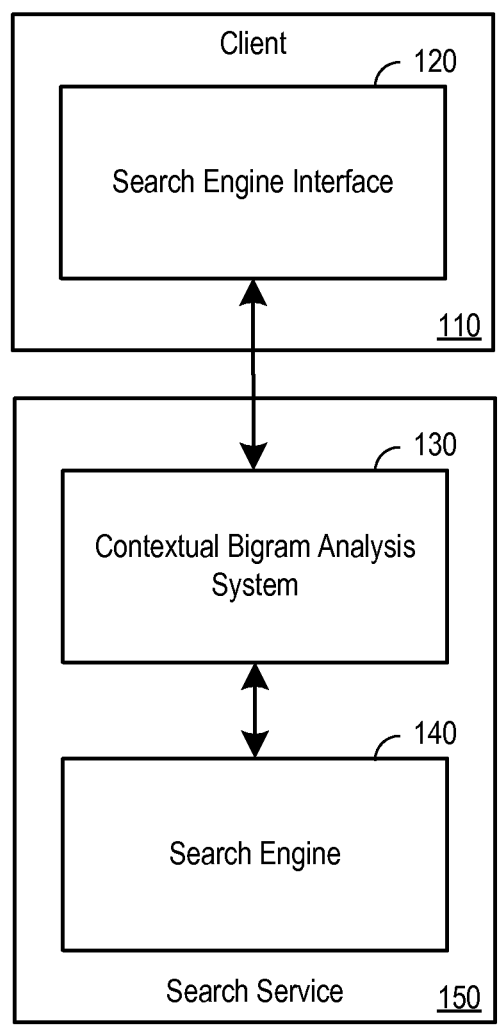
FIG. 1 is a block diagram illustrating an example search service including contextual bigram analysis system.

FIG. 1 is a block diagram illustrating an example search system including contextual bigram analysis system. The search system 100 can receive input from a client 110. In some implementations, the search system includes a search engine interface 120, a contextual bigram analysis system 130 and a search engine 140. The search engine interface 120 can be implemented as one or more web pages through which a user interacts with the system 100, including a web page distributed to and displayed by the client (e.g., a browser) that enables the user using the client to submit a search query.

The search engine interface 120 can distribute the received search query to a search engine 140 and a contextual bigram analysis system 130. In some implementations, the contextual bigram analysis system 130 can be part of a search service 150. For example, the contextual bigram analysis system 130 can be implemented within the search service 150 to provide the contextual bigram analysis directly to the search engine 140. The search service, in some examples, can provide additional services related to searching (e.g., advertisements, query suggestions, online shopping, etc.).

In other implementations, the contextual bigram analysis component 130 can be provided independently of the search service. For example, a third party application can be integrated into the system by a plug-in component to the search engine interface 120 located on the client device 110. In such examples, the plug-in component can communicate the query to a contextual bigram analysis system provided by a third party, and the contextual bigram analysis system can analyze the query and reformulate the query with bigrams delimited, for example, by quotation marks. In other examples, the contextual bigram analysis system can provide the search interface to the user. In such examples, queries originating from the search interface are received by the contextual bigram analysis system. Such queries can be reformulated and submitted to a search service. The search results for the reformulated query can be received by the contextual bigram analysis system and provided to the client through the search interface 120.

In some implementations, the search engine 140 can derive relevance scores associated with the most relevant pages based on the search query. In further implementations, the search engine 140 can derive rank scores associated with the quality of a web page as measured, for example, by the number of other sites linking to a page. The search engine 140 can also derive a relevance score (e.g., an information retrieval (IR) score) related to the search results. In some implementations, IR scores can be computed from, for example, dot products of feature vectors corresponding to a query and a document relevance, ranking scores, and/or combinations of IR scores and rank scores, etc. Other search engines can also be used.

The contextual bigram analysis system 130 can receive a search query from the search interface 120 and provides an indication to the search engine 140 of which sequences of terms in the current query are not bigrams (or n-grams). In some implementations, the contextual bigram analysis system 130 can provide the bigram analysis based upon context derived from previous search queries.

In some implementations, the contextual bigram analysis system 130 can identify which of the current search terms are not bigrams based upon context derived from one or more previous search queries. For example, if a user enters a search query Q1 including search terms A, B and C, and subsequently enters a current search query Q2 including search terms A, B, D, E and F, it is likely that D, E and F are not constituent terms of bigrams, at least when considered in combination search terms A and B, which are common terms between Q1 and Q2, even though B is adjacent to D and the term "B D" would be analyzed to determine whether it was a bigram in traditional search engines. A constituent term of a bigram is defined as one word that, when combined with another constituent term, comprises a bigram. The contextual bigram analysis system 130 can identify differing search terms between queries (e.g., additional or substitute search terms in a current search query) and preclude those additional or substitute search terms from bigram analysis.

In some implementations, the previous search queries that are used in the contextual analysis are those queries that originate from the same user within predefined proximity to a current query, thereby providing context for the current query. The predefined proximity, in some implementations, can define a time period within which the previous query must be received to be considered as context for the current query. In other implementations, the predefined proximity can be defined by the number of queries that were submitted between two queries. For example, if the user enters query Q1, then enters query Q2, and then enters query Q3, query Q1 might only contain attenuated context for query Q3, while query Q2 provides better context for query Q3 because there are no queries submitted between queries Q2 and Q3, while there is one query submitted between queries Q1 and Q3. Thus, the predefined proximity can be a maximum number of queries submitted between queries for those queries to be considered as context for each other.

In some implementations, the contextual bigram analysis system 130 can identify which of the search terms included in a current search query are bigrams. The contextual bigram analysis system 130 can identify bigrams, for example, by comparing each of the potential bigrams in a current query to known bigrams included in a bigram data store, while excluding some potential bigrams from analysis based upon context derived from one or more previous queries. For example, if the query "New York hot dog" is received followed by "New York hot dog vendors," the contextual bigram analysis system 130 can exclude the term "vendors" from consideration as part of a bigram, and identify the potential bigrams "New York," "York hot" and "hot dog." Upon comparison to known bigrams included in a bigram data store, the contextual query analysis system 130 can determine that "New York" and "hot dog" are bigrams. In those implementations where the contextual bigram analysis system is independent of the search engine, the contextual bigram analysis system 130 can reformulate the query to account for any bigrams identified by the contextual bigram analysis system 130. For example, if the search query "New York hot dog restaurant" is received, the contextual bigram analysis system 130 can reformulate the query to delimit the bigrams "New York" and "hot dog" (e.g., the reformulated query can read "'New York' 'hot dog' restaurant").

Figure 2A:
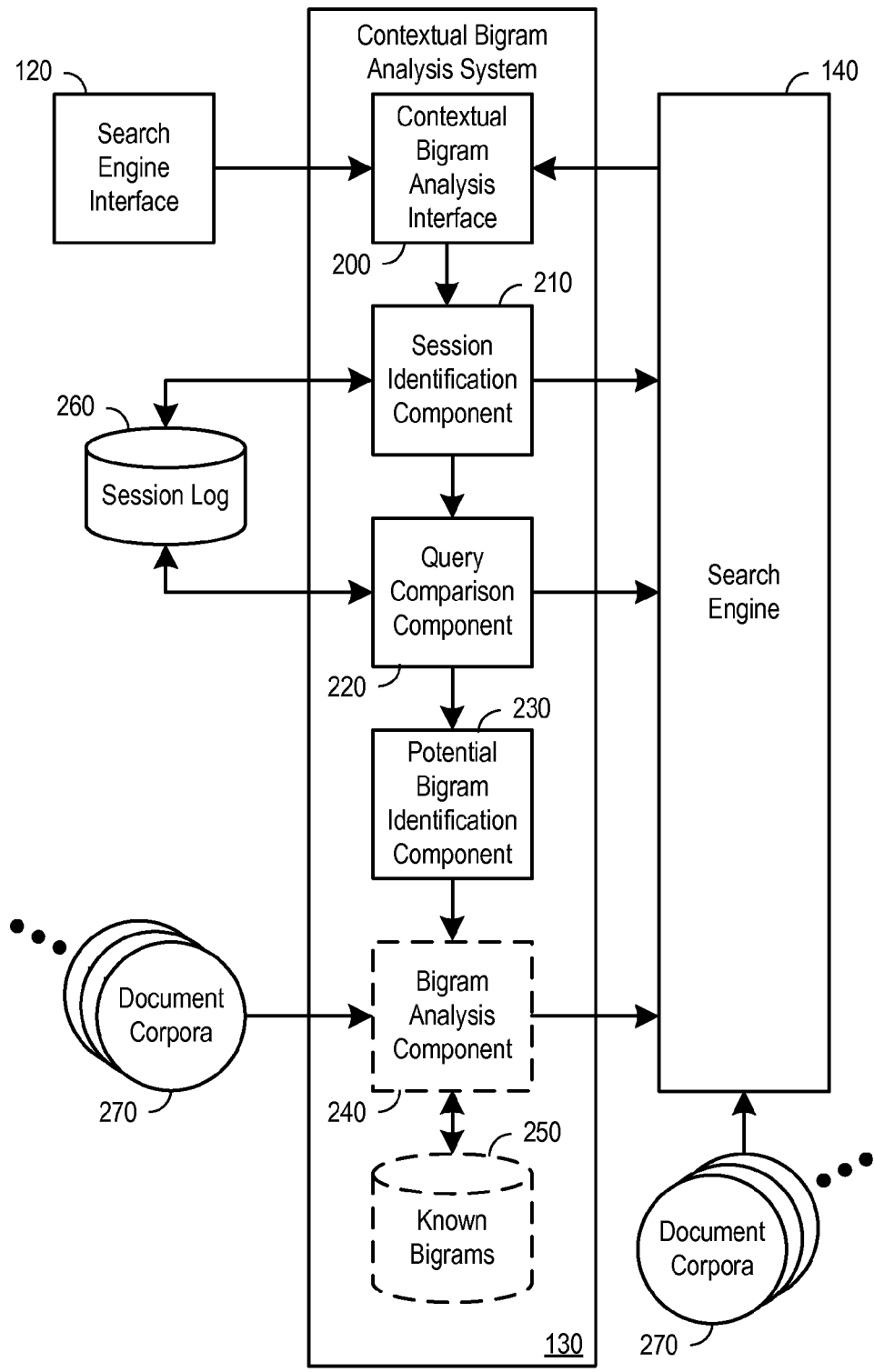
FIG. 2A is a block diagram illustrating an example of a bigram analysis system.

FIG. 2A is a block diagram illustrating an example of a bigram analysis system 130. In some implementations, the bigram analysis system 130 can include an contextual bigram analysis interface 200, a session identification component 210, a query comparison component 220, and a potential bigram identification component 230. Optional implementations can include a bigram analysis component 240 and a known bigram store 250. In some implementations, the contextual bigram analysis interface 200 can receive search queries from a search engine interface 120 residing on a client computer, for example, and provide results for a search query received from a search engine 140 to the search engine interface 120.

The contextual bigram analysis interface 200 can also communicate a received search query to a session identification component 210. In some implementations, the session identification component 210 can operate to determine whether a current query is part of any current session. The session identification component 210 can determine whether a client device submitting a current query has submitted a previous query within a predefined proximity of the current query to determine whether the current query is part of any current session. If the current query is not part of a current session, the session identification component 210 can forward the received query to the search engine 140. The search engine 140 can then provide search results from the received query back to the contextual bigram analysis interface 200 for distribution to the search engine interface 120.

If the received query is identified as part of a current session, the session identification component 210 can communicate information identifying the current query to a query comparison component 220 along with information identifying one or more previous queries related to the current query (e.g., by user or proximity). In some implementations, the information identifying the current query and/or information identifying one or more previous queries related to the current query can include the previous query itself. In other implementations, the query comparison component 220 can retrieve the current query and/or previous query from a session log 260. The session log can store information identifying currently pending (e.g., non-expired) search sessions, including one or more queries used during the respective search sessions.

The query comparison component 220 can compare the current query to one or more previous queries to identify search terms appearing in the current query that do not appear in the one or more previous queries. For example, given a previous query Q1 including search terms A, B and C, and a current query Q2 including search terms A, B and D, the search term D can be identified as a substitute search term as between Q1 and Q2.

In some implementations, the query comparison component 220 can compare the current query to one or more previous queries to determine whether any search terms included in the current query are found in any one or more previous queries. Common terms include those terms that occur within both the current query and one or more previous queries. For example, given a previous query Q1 including search terms A, B and C, and a current query Q2 including search terms A, B and D, the search terms A and B can be identified as common search terms to the current query and the previous query.

In some implementations, common terms can be further limited to those terms that occur within both the current query and one or more previous queries at the same ordinal position within both the current query and the previous query. The ordinal position defines the location within the search query where a respective term appears. For example, given previous query Q1 including search terms A, B and C (e.g., having A at position 1, B at position 2 and C at position 3) and a current query Q2 including search terms A, C and D (e.g., having A at position 1, C at position 2 and D at position 3), in those implementations requiring ordinal position to be maintained to identify terms as common terms, only A is identified as a common term between Q1 and Q2. Thus, even though C occurs in both queries, because C occurs at a different ordinal position in the current query than it did in the previous query, it is not considered a common term in those implementations requiring ordinal position to be maintained for a term to be identified as a common term between the current query and previous query.

If no differing search terms are identified by the query comparison component 220 (e.g., because the current query is identical to a previous query or merely eliminated search terms), the query comparison component 220 can communicate the search query to the search engine 140, and the search engine 140 can provide search results for the search query to the contextual bigram analysis interface 200 for distribution to the search engine interface 120. However, if differing search terms are identified by the query comparison component 220, the query comparison component 220 communicates the current query and an identification the differing terms to a potential bigram identification component 230.

The potential bigram identification component 230 identifies those search terms within the current search query that can be input into a bigram analysis. In some implementations, the potential bigram identification component 230 can preclude the differing terms from being considered as part of the bigram analysis. For example, given a previous query Q1 having search terms "A B," and a current query Q2 having search terms "A B C," the potential bigram identification module can identify "A B" as potential bigrams while excluding consideration of "B C" as a potential bigram because the combination of search terms "B C" includes the differing search term "C" combined with a common search term "B."

In some implementations, additional or substitute search terms can be analyzed to identify potential bigrams consisting of the additional or substitute search terms. Additional search terms defined as those search terms that have an ordinal position within the current query that is not present one or more previous search queries identified as providing context for the current query. A substitute search term can be defined as a search term included in a current query that has an ordinal position that matches an ordinal position of a search term included in a previous query, but is not a common term between the queries. Thus, additional or substitute search terms, while not considered as components of potential bigrams in combination with common terms between the current query and one or more previous queries, can nevertheless be considered as components of potential bigrams when in combination with other immediately adjacent additional or substitute search terms.

In some implementations, identification of which search terms are to be excluded from consideration as component terms to a bigram can be provided to a search engine 140. In such implementations, the search engine 140 can analyze the current query given the identification of the terms to be excluded from analysis to identify bigram terms. The search engine 140 can then return search results to the contextual bigram analysis interface 200 for distribution to a client device using the search engine interface 120.

Optionally, the contextual bigram analysis system 130 can include a bigram analysis component 240. The bigram analysis component 240 can compare any potential bigrams identified by the potential bigram identification component 240 to known bigrams stored in a known bigram store 250 to identify which of the identified potential bigram is an actual bigram. If the bigram analysis component 240 discovers a match between an identified potential bigram and a known bigram stored in the known bigram store 250, the identified potential bigram is delimited as a bigram term. In those instances where bigrams overlap (e.g., a single search term is included in two delimited bigrams), both bigrams can be submitted independently or the bigrams can be split and submitted as multiple individual terms In some implementations, the bigram analysis component 240 can identify the known bigrams from document copora 270. The document corpora 270 can include, for example, documents retrieved from the World Wide Web or other available resources. In some implementations, the known bigrams can be identified by analyzing the contents of the documents retrieved from the document copora 270. Specifically, the relationship of the words included in the document can be analyzed to identify those terms which appear adjacent to one another with a degree of regularity (e.g., a threshold number of times or with a threshold frequency). When a certain set of terms appear together with a predefined degree of regularity, the terms are considered bigrams (or n-grams, where n is the length of the group of terms). In other implementations, the determination of whether a term is a bigram can be based upon a degree of likelihood that one term will follow another term. For example, based upon analyzing the document copora 270, it can be determined that many words have an equal likelihood of occurrence following a given word, while certain words have a significantly higher likelihood of occurrence following the given word. Those words that have a higher likelihood to follow the given word can be identified as a bigram in combination with the given word.

Once bigrams have been identified, the known bigrams can be stored to a known bigram data store 260. The bigram analysis component 250 can compare potential bigrams to known bigrams to identify whether the potential bigrams should be demarcated as bigrams in a search query. In some implementations, the bigram analysis component 250 can reformulate the query to provide demarcation of the bigrams for the search engine 140. In such implementations, the search engine 140 can perform the search using the reformulated query and provide results from the reformulated search query to an contextual bigram analysis interface 200 for distribution to a search engine interface 120.

Figure 2B:
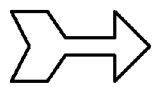
FIG. 2B-2E are query sequence diagram illustrating an examples for contextual bigram analysis.
Figure 2C:
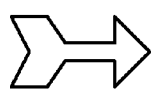

FIG. 2B-2E are query sequence diagrams illustrating examples for contextual bigram analysis. In the example of FIG. 2B, a first query (Q1) includes the sequence of search terms "A B." A second search query (Q2) includes the sequence of search terms "A B C." Contextual bigram analysis systems exclude the search term C from consideration as part of a bigram in combination with A and B. Thus, a potential bigram identification component identifies one potential bigram ("A B"), as opposed to two potential bigrams ("A B" and "B C"). In the example of FIG. 2C, a first search query (Q1) includes the search terms A and B.

A second search query (Q2) includes the search terms B and A. While the terms A and B are common to both Q1 and Q2, neither of the search terms B or A is classified as a common term because both of terms A and B have a different ordinal position in Q1 and Q2. Thus, a query comparison component 220 can send the current query (Q2) to the search engine 140 for processing without demarcation of bigrams or identification of potential bigrams.

Figure 2D:
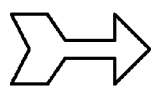

In the example of FIG. 2D, a first search query (Q1) includes the sequence of search terms "A B." A second search query (Q2) includes the search terms "C B A." In this example, none of search terms C, B or A are identified as constituent terms of potential bigrams. While A is common to both Q1 and Q2, it has a different ordinal position in Q1 than it has in Q2. Moreover, while B is common to both Q1 and Q2, and has an identical ordinal position in each of Q1 and Q2, there are no common adjacent terms with which B can be considered part of a bigram. Thus, the potential bigram identification component 230 determines that there are no potential bigrams in Q2 and does not demarcate any of the search terms nor does it identify any of the terms as potential bigrams. The query Q2 is passed to the search engine 140, and the results from the query Q2 are passed back to the contextual bigram analysis interface 200 for distribution to a search engine interface 120.

Figure 2E:

In the example of FIG. 2E, a first query (Q1) includes the search terms A, B and C. A second search query (Q2) includes the search terms A, B, D and E. In this example, the potential bigram identification module 230 identifies "A B" as a potential bigram. In some implementations, the potential bigram identification module 230 can also identify "D E" as a potential bigram because they are additional or substitute search terms that are adjacent to each other. Thus, "A B" can be identified as a potential bigram and "D E" can be identified as a potential bigram. The bigram analysis module 240 can determine whether potential bigrams "A B" or "D E" are bigrams by comparing the potential bigrams "A B" and "D E" to known bigrams. If the potential bigram "A B" exists among known bigrams, "A B" is identified as a bigram. Otherwise, the terms A and B are treated as a pair of terms. If the potential bigram "D E" exists among known bigrams, "D E" is identified as a bigram. Otherwise, the terms D and E are treated as a pair of terms. In other implementations, differing terms are not analyzed to determine whether any adjacent differing terms make up a bigram.

Figure 3:
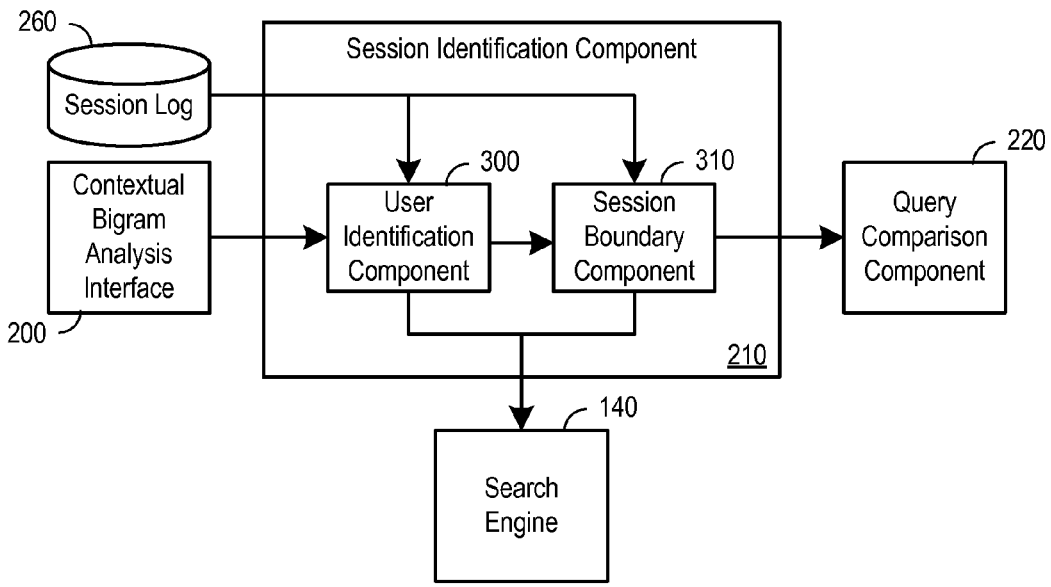
FIG. 3 is a block diagram illustrating an example session identification component.

FIG. 3 is a block diagram illustrating an example session identification component 210. The session identification component 210 can include a user identification component 300 and a session boundary component 310. In some implementations, the user identification component 300 and the session boundary component 310 can work together to determine whether a current query is part of an existing session.

The user identification component 300 can receive a current query from a contextual bigram analysis interface 200. The user identification component 300 can extract a client device identifier of a client device submitted the current query from the query. The identifier of the client device that submitted the current query can be compared to a session log 260 to determine whether the identifier exists among sessions tracked by the session log. The session log can be updated, for example, by the search engine. If the identifier of the client device that submitted the current query does not exists in the session log, the current query is determined to be the beginning of a new session. The query is forwarded to the search engine 140, and the search engine 140 can provide search results for the current query to the contextual bigram analysis interface 200 for distribution to the search engine interface 120.

However, if the identifier of the client device that submitted the current query exists in the session log, the current query is forwarded to a session boundary component 310 to determine if the current query is part of a session. In some implementations, a boundary of a search session can be defined by a period of time between queries. For example, if a particular client enters a query, a current search session can be initiated. The current search session can be terminated when the search engine has not received further queries from the user for a preset period of time (e.g., 5-10 minutes). In other implementations, the boundary of the search session can be defined by a user indicating the beginning and end of a search session (e.g., by logging into a search engine interface and logging out of a search engine interface). In still further implementations, the boundary of the search session can be defined by a relationship between a newly received search query and previously received search queries from the same user. In some examples, a relationship can be identified based upon a current search query including a common search term to a previous search query from the user. In another example, a relationship can be identified based upon similar pages matching previous search results or a topic associated with the previous search queries or results. For example, related search queries might produce similar results. Thus, a previous search query might produce result pages A, B, C and D. A new search query might produce result pages C, E, F and G. These search queries can be identified as related because they result in at least one of the same pages being produced by the search engine. In further implementations, any of the foregoing techniques can be combined to identify whether a new query belongs to a previous session. For example, a new search query received from an identical user within a threshold time after a previous search query associated with the session has been received can be compared to previous search queries associated with the session to determine whether a relationship exists between the new search query and the previous search queries associated with the session. If the new query is not related to previous queries from the same user or is not received within a threshold time period, a new session can be initiated.

If the current query falls within a session boundary of an existing session, then the current query is determined to be part of the session. The current query and one or more previous queries that occurred within the boundary of the current session are then be forwarded to a query comparison component 220 to identify whether the query contains terms in common with the one or more previous queries, such that potential bigrams can be identified.

Figure 4:
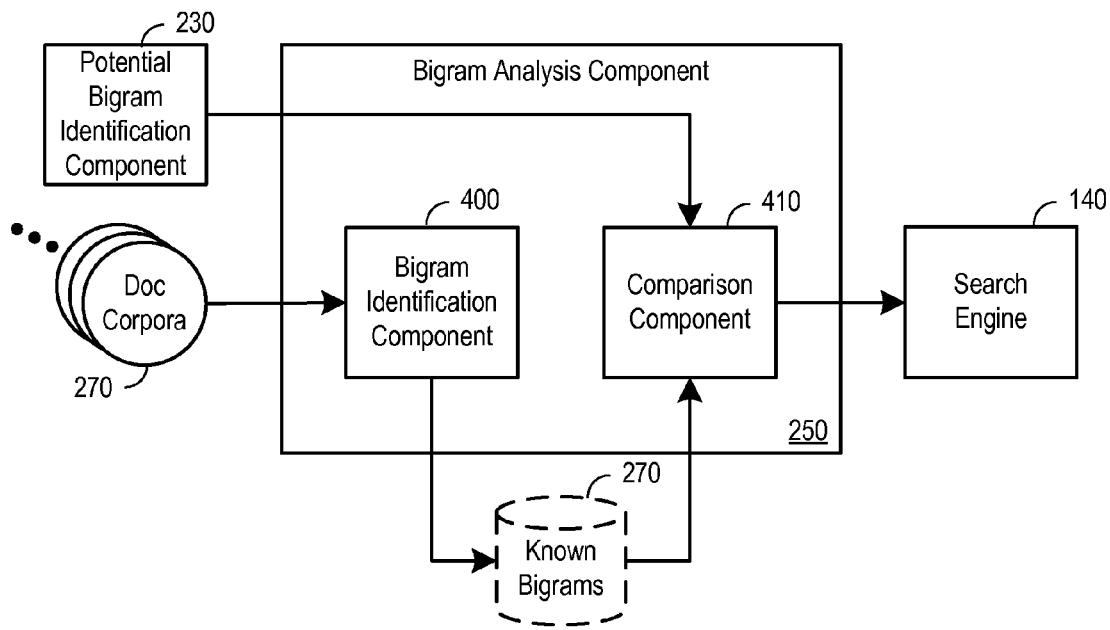
FIG. 4 is a block diagram illustrating an example bigram analysis component.

FIG. 4 is a block diagram illustrating an example bigram analysis component 250. The bigram analysis component can include a bigram identification component 400 and a comparison component 410. In some implementations, the bigram identification component 400 can analyze document corpora 270 to identify statistical usage patterns within the documents included in the document corpora 270. Statistical usage patterns can include the frequency with which or number of times two words appear together, or the statistical probability that a particular word will precede or follow another word. For example, it might be determined that the probability that the two words appear together is 10%, while the average probability that the word appears is adjacent to another is only 1%. Words that show a relation to each other that is greater than an expected probability (e.g., the probability that the word appears adjacent to any word) based upon the statistical modeling can be determined to be components of a bigram.

When a bigram is identified, the bigram can be stored to a known bigram data store 260. Storage to the known bigram data store 260 can indicate that occurrences of the same two words together in other contexts (e.g., within a search query) will be identified as a bigram. For example, the bigram data store 260 can be queried to determine whether a potential bigram matches a known bigram.

The comparison component 410 can receive potential bigrams from a potential bigram identification component 230. The potential bigrams are those terms within a search query that have been identified by a contextual bigram analysis system as potential bigrams based upon the context of the current search query in relation to one or more previous queries in the same session. The potential bigrams can be compared to the known bigram data store 260 to identify whether any of the potential bigrams match the known bigrams. If a potential bigram matches a known bigram, the matching potential bigram is confirmed as a bigram.

In those implementations where the contextual bigram analysis system (e.g., contextual bigram analysis system 130 of FIG. 1) is independent of the search engine 140, the comparison component can reformulate the current query to demarcate the identified bigrams and can communicate the reformulated query to the search engine 140. The search engine 140 can then locate search results based upon the reformulated search query and provide the search results to the interface for distribution to a client device through a search engine interface. If there are no confirmed bigrams, the current query is provided to the search engine 140. The search engine 140 can locate search results based upon the current query and provide the search results to a client device.

In other implementations, the current search query along with an identification of the confirmed bigrams can be provided to the search engine 140. In such implementations, the search engine can use the identification of the confirmed bigrams to segment the search query to locate the most relevant documents (e.g., search results) based upon the bigrams included in the current query. The search results can then be provided to a client device.

Figure 5:
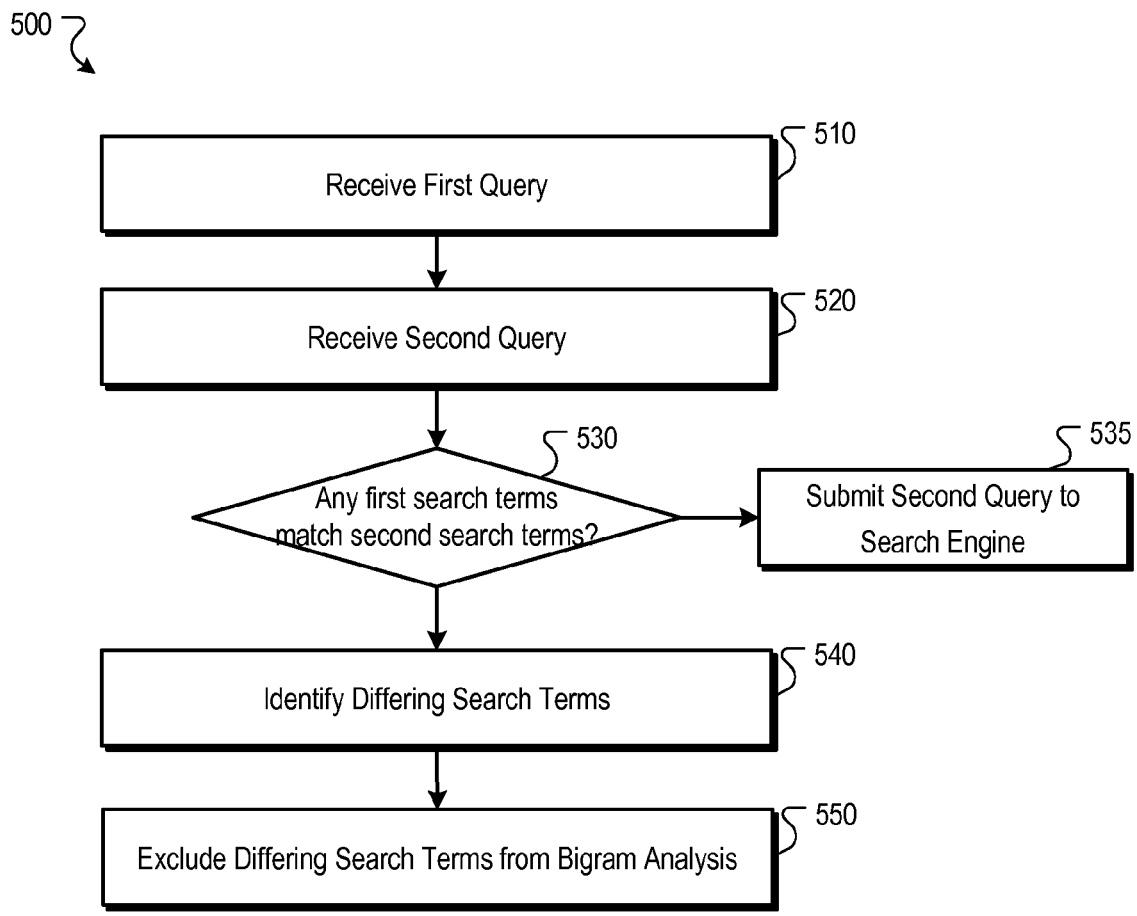
FIG. 5 is a flowchart illustrating an example process for contextual bigram analysis. Like reference numbers and designations in the various drawings indicate like elements.

FIG. 5 is a flowchart illustrating an example process 500 for contextual bigram analysis. A first query can be received (510). The first query can be received, for example, by an interface component (e.g., contextual bigram analysis interface 200 of FIG. 2A) of a contextual bigram analysis system (e.g., contextual bigram analysis system 130 of FIG. 2A). The first query can include one or more search terms. Moreover, each of the search terms can be associated with an ordinal position within the first query. For example, the query "New York hot dog" includes the term "New" at a first position, "York" at a second position, "hot" at a third position, and "dog" at a fourth position. In some implementations, the first query can be part of a search session.

A second query can be received (520). The second query can be received, for example, by an interface component (e.g., contextual bigram analysis interface 200 of FIG. 2A) of a contextual bigram analysis system (e.g., contextual bigram analysis system 130 of FIG. 2A). The second query includes one or more search terms. Each of the search terms has an ordinal position within the second query. For example, the query "New York hot dog vendors" includes the term "New" at a first position, "York" at a second position, "hot" at a third position, "dog" at a fourth position, and "vendors" at a fifth position. In some implementations, the first query can be part of a search session.

A determination is made whether any of first search terms match any of the second search terms (530). The determination can be made, for example, by a query comparison component (e.g., query comparison component 220 of FIG. 2A) of a contextual bigram analysis system (e.g., contextual bigram analysis system 130 of FIG. 2A).

If none of the first search terms match any of the second search terms, the second query can be submitted to a search engine (535). The second query can be submitted to a search engine, for example, by a contextual bigram analysis system interface (e.g., contextual bigram analysis interface 200 of FIG. 2A). In some implementations, the contextual bigram analysis system determines that the search queries are not related enough to provide context based upon sharing no similar terms, and submits the second query to a search engine.

If any of the first search terms match any of the second search terms, differing search terms are identified (540). Differing search terms can be identified, for example, by a potential bigram identification component (e.g., potential bigram identification component 230 of FIG. 2A) of a contextual bigram analysis system (e.g., contextual bigram analysis system 130 of FIG. 2A). In some implementations, differing search terms include both additional search terms and substitute search terms. Additional search terms are those terms in the second query with an ordinal position greater than that any of the terms in the first query. A substitute search term is a term in the second query that is different from a term in the first query having the same ordinal position in the first query.

Differing search terms can be excluded from bigram analysis (550). Differing search terms can be excluded from bigram analysis, for example, by a potential bigram identification component (e.g., potential bigram identification component 230 of FIG. 2) in conjunction with a search engine (e.g., search engine 140 of FIG. 2) or a bigram analysis component (e.g., bigram analysis component 240 of FIG. 2) and a known bigram store (e.g., known bigram store 250 of FIG. 2). In some implementations, the differing search terms are not considered when analyzing which of the search terms included in the second search query are compared to known bigrams. In other implementations, the differing search terms are only considered in combination with other differing search terms when determining which of the search terms included in the second search query are compared to known bigrams.

While the above implementations are described in terms of bigram analysis, in other implementations, the components and engines described herein can provide contextual analysis of n-grams, where n is the number of terms being identified as related to each other for grouping in a search query.

Although in the various implementations described above, the sibling queries are show as derived offline before a current search query is received, in other implementations the sibling queries to a currently received query can be derived while the search engine is retrieving search results, and the sibling queries can be identified from a real-time analysis of the query log data.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving during a search session a first search query comprising a first set of search terms, each search term in the first set having a respective first ordinal position, each first ordinal position defining a position of a respective search term in the first set relative to other search terms in the first set;
   receiving during the search session and after receipt of the first search query a subsequent search query comprising a second set of search terms, each term in the second set having a respective second ordinal position, each second ordinal position defining a position of a respective search term in the second set relative to other search terms in the second set;
   determining that the second set of search terms in the subsequent search query includes differing search terms, each of the differing search terms being a search term that is not included in the first set of search terms in the first search query;
   identifying additional search terms from the second set of search terms in the subsequent search query, each additional search term being a differing term and having a second ordinal position in the second set that is greater than any first ordinal position of any search term in the first set of search terms in the first search query; and
   performing, by one or more data processors, an n-gram analysis on the additional search terms separately from an n-gram analysis on common terms between the first and subsequent search queries, each common term being a search term that is included in both the first set of search terms in the first search query and the second set of search terms in the subsequent search query and has a first ordinal position in the first set that matches that of a second ordinal position in the second set.

2. The method of claim 1, comprising:
   identifying substitute search terms from the second set of search terms, each substitute search term being a differing search term and having a second ordinal position that matches a first ordinal position of a search term in the first set of search terms;
   determining that one of the substitute search terms is immediately adjacent to another one of the substitute search terms; and
   performing an n-gram analysis including the adjacent substitute search terms separately from an n-gram analysis on the common terms.

3. The method of claim 1, comprising:
   identifying substitute search terms from the second set of search terms, each substitute search term being a differing search term and having a second ordinal position that matches a first ordinal position of a search term in the first set of search terms;
   determining that one of the substitute search terms is immediately adjacent to one of the additional search terms; and
   performing an n-gram analysis including the one of the substitute search terms and the immediately adjacent one of the additional search terms separately from an n-gram analysis on the common terms.

4. The method of claim 1, comprising:
   identifying adjacent common terms, the adjacent common terms being common terms that are located adjacent to one another in the first set of search terms and adjacent to one another in the second set of search terms; and
   performing an n-gram analysis on the adjacent common terms.

5. The method of claim 1, comprising:
   excluding the differing search terms from an n-gram analysis of the subsequent search query.

6. The method of claim 1, wherein performing an n-gram analysis on the additional search terms comprises:
   determining that the additional search terms match a known n-gram in an n-gram data store; and
   identifying the additional search terms as an n-gram.

7. The method of claim 1, wherein the additional search terms are a bigram and performing an n-gram analysis on the additional search terms comprises performing a bi-gram analysis on the additional search terms.

8. A system comprising:
   one or more data processors; and
   instructions stored on a computer storage apparatus that when executed by the one or more data processors cause the one or more data processors to perform operations comprising:
   receiving during a search session a first search query comprising a first set of search terms, each search term in the first set having a respective first ordinal position, each first ordinal position defining a position of a respective search term in the first set relative to other search terms in the first set;
   receiving during the search session and after receipt of the first search query a subsequent search query comprising a second set of search terms, each term in the second set having a respective second ordinal position, each second ordinal position defining a position of a respective search term in the second set relative to other search terms in the second set;
   determining that the second set of search terms in the subsequent search query includes differing search terms, each of the differing search terms being a search term that is not included in the first set of search terms in the first search query;
   identifying additional search terms from the second set of search terms in the subsequent search query, each additional search term being a differing term and having a second ordinal position in the second set that is greater than any first ordinal position of any search term in the first set of search terms in the first search query; and
   performing an n-gram analysis on the additional search terms separately from an n-gram analysis on common terms between the first and subsequent search queries, each common term being a search term that is included in both the first set of search terms in the first search query and the second set of search terms in the subsequent search query and has a first ordinal position in the first set that matches that of a second ordinal position in the second set.

9. The system of claim 8, wherein the instructions, when executed by the one or more data processors, cause the one or more data processors to perform operations comprising:
- identifying substitute search terms from the second set of search terms, each substitute search term being a differing search term and having a second ordinal position that matches a first ordinal position of a search term in the first set of search terms;
- determining that one of the substitute search terms is immediately adjacent to another one of the substitute search terms; and
- performing an n-gram analysis including the adjacent substitute search terms separately from an n-gram analysis on the common terms.

10. The system of claim 8, wherein the instructions, when executed by the one or more data processors, cause the one or more data processors to perform operations comprising:
- identifying substitute search terms from the second set of search terms, each substitute search term being a differing search term and having a second ordinal position that matches a first ordinal position of a search term in the first set of search terms;
- determining that one of the substitute search terms is immediately adjacent to one of the additional search terms; and
- performing an n-gram analysis including the one of the substitute search terms and the immediately adjacent one of the additional search terms separately from an n-gram analysis on the common terms.

11. The system of claim 8, wherein the instructions, when executed by the one or more data processors, cause the one or more data processors to perform operations comprising:
- identifying adjacent common terms, the adjacent common terms being common terms that are located adjacent to one another in the first set of search terms and adjacent to one another in the second set of search terms; and
- performing an n-gram analysis on the adjacent common terms.

12. The system of claim 8, wherein the instructions, when executed by the one or more data processors, cause the one or more data processors to perform operations comprising:
- excluding the differing search terms from an n-gram analysis of the subsequent search query.

13. The system of claim 8, wherein performing an n-gram analysis on the additional search terms comprises:
- determining that the additional search terms match a known n-gram in an n-gram data store; and
- identifying the additional search terms as an n-gram.

14. The system of claim 8, wherein the additional search terms are a bigram and performing an n-gram analysis on the additional search terms comprises performing a bi-gram analysis on the additional search terms.

15. A non-transitory computer-readable storage medium having instructions stored thereon, which, when executed by one or more data processors, cause the one or more processors to perform operations comprising:
- receiving during a search session a first search query comprising a first set of search terms, each search term in the first set having a respective first ordinal position, each first ordinal position defining a position of a respective search term in the first set relative to other search terms in the first set;
- receiving during the search session and after receipt of the first search query a subsequent search query comprising a second set of search terms, each term in the second set having a respective second ordinal position, each second ordinal position defining a position of a respective search term in the second set relative to other search terms in the second set;
- determining that the second set of search terms in the subsequent search query includes differing search terms, each of the differing search terms being a search term that is not included in the first set of search terms in the first search query;
- identifying additional search terms from the second set of search terms in the subsequent search query, each additional search term being a differing term and having a second ordinal position in the second set that is greater than any first ordinal position of any search term in the first set of search terms in the first search query; and
- performing an n-gram analysis on the additional search terms separately from an n-gram analysis on common terms between the first and subsequent search queries, each common term being a search term that is included in both the first set of search terms in the first search query and the second set of search terms in the subsequent search query and has a first ordinal position in the first set that matches that of a second ordinal position in the second set.

16. The non-transitory computer-readable storage medium of claim 15, wherein the instructions, when executed by one or more data processors, cause the one or more processors to perform operations comprising:
- identifying substitute search terms from the second set of search terms, each substitute search term being a differing search term and having a second ordinal position that matches a first ordinal position of a search term in the first set of search terms;
- determining that one of the substitute search terms is immediately adjacent to another one of the substitute search terms; and
- performing an n-gram analysis including the adjacent substitute search terms separately from an n-gram analysis on the common terms.

17. The non-transitory computer-readable storage medium of claim 15, wherein the instructions, when executed by one or more data processors, cause the one or more processors to perform operations comprising:
- identifying substitute search terms from the second set of search terms, each substitute search term being a differing search term and having a second ordinal position that matches a first ordinal position of a search term in the first set of search terms;
- determining that one of the substitute search terms is immediately adjacent to one of the additional search terms; and
- performing an n-gram analysis including the one of the substitute search terms and the immediately adjacent one of the additional search terms separately from an n-gram analysis on the common terms.

18. The non-transitory computer-readable storage medium of claim 15, wherein the instructions, when executed by one or more data processors, cause the one or more processors to perform operations comprising:
- identifying adjacent common terms, the adjacent common terms being common terms that are located adjacent to one another in the first set of search terms and adjacent to one another in the second set of search terms; and
- performing the adjacent common terms for an n-gram analysis.

19. The non-transitory computer-readable storage medium of claim 15, wherein the instructions, when executed by one or more data processors, cause the one or more processors to perform operations comprising:
excluding the differing search terms from an n-gram analysis of the subsequent search query.

20. The non-transitory computer-readable storage medium of claim 15, wherein performing an n-gram analysis on the additional search terms comprises:
determining that the additional search terms match a known n-gram in an n-gram data store; and
identifying the additional search terms as an n-gram.

* * * * *